United States Patent
Cousin

[11] 3,872,740
[45] Mar. 25, 1975

[54] DEVICE FOR SUPPORTING, GUIDING AND ADJUSTING MOBILE SEATS, OR VEHICLE SEATS AND THE LIKE

[75] Inventor: Maurice Claude Cousin, Flers, France

[73] Assignee: A. & M. Cousin & Cie Etablissements Cousin Freres, Le Bois de Flers, Flers, Orne, France

[22] Filed: Sept. 24, 1973

[21] Appl. No.: 400,208

[30] Foreign Application Priority Data
Oct. 6, 1972  France .............................. 72.35597

[52] U.S. Cl. .................................................. 74/533
[51] Int. Cl. ............................................ G05g 5/06
[58] Field of Search .............................. 74/533, 527

[56] References Cited
UNITED STATES PATENTS
3,450,425  6/1969  Leonhardt ...................... 74/533 X Primary Examiner—Leonard H. Gerin

[57] ABSTRACT

The device comprises at least one slide delimiting two rails one of said rails containing guiding elements constituted by one ball 15 and a rod 16 extending beyond the slide to form a component $16_1$ controlling a resilient lock 22 supported by the mobile element 3 of the slide to cooperate with notches 25 of the fixed element 2 of said slide.

8 Claims, 6 Drawing Figures

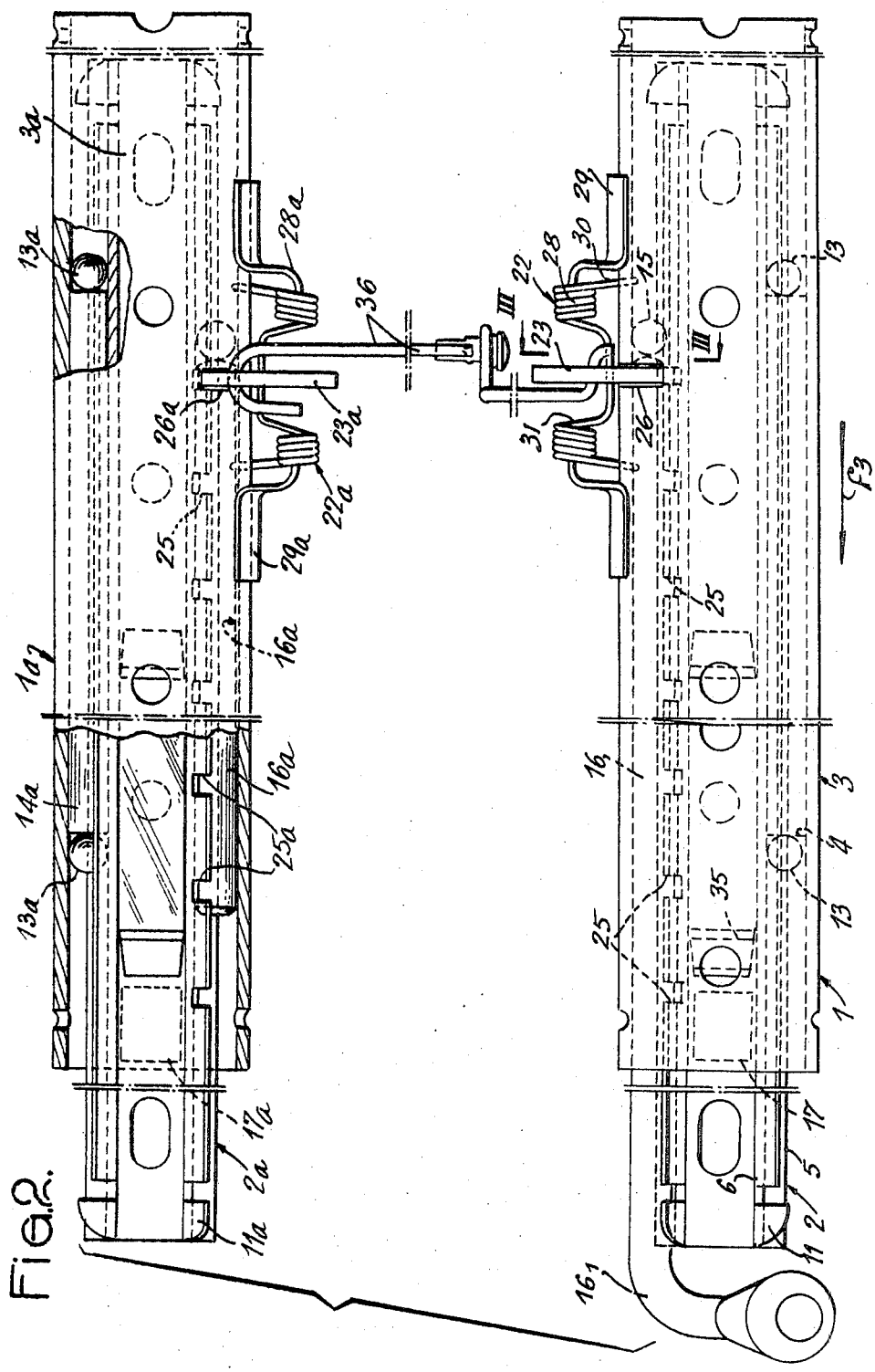

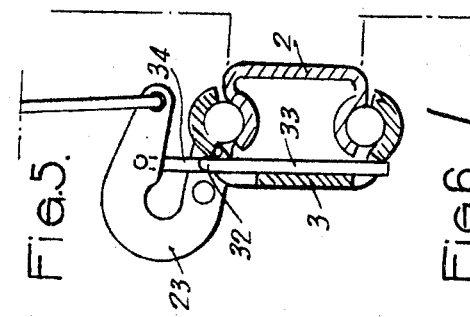
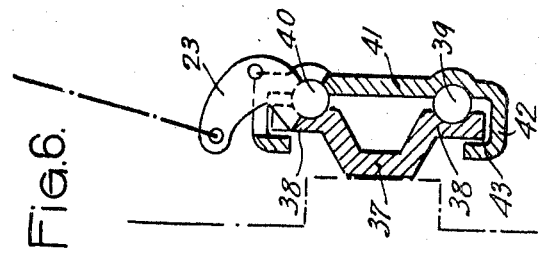
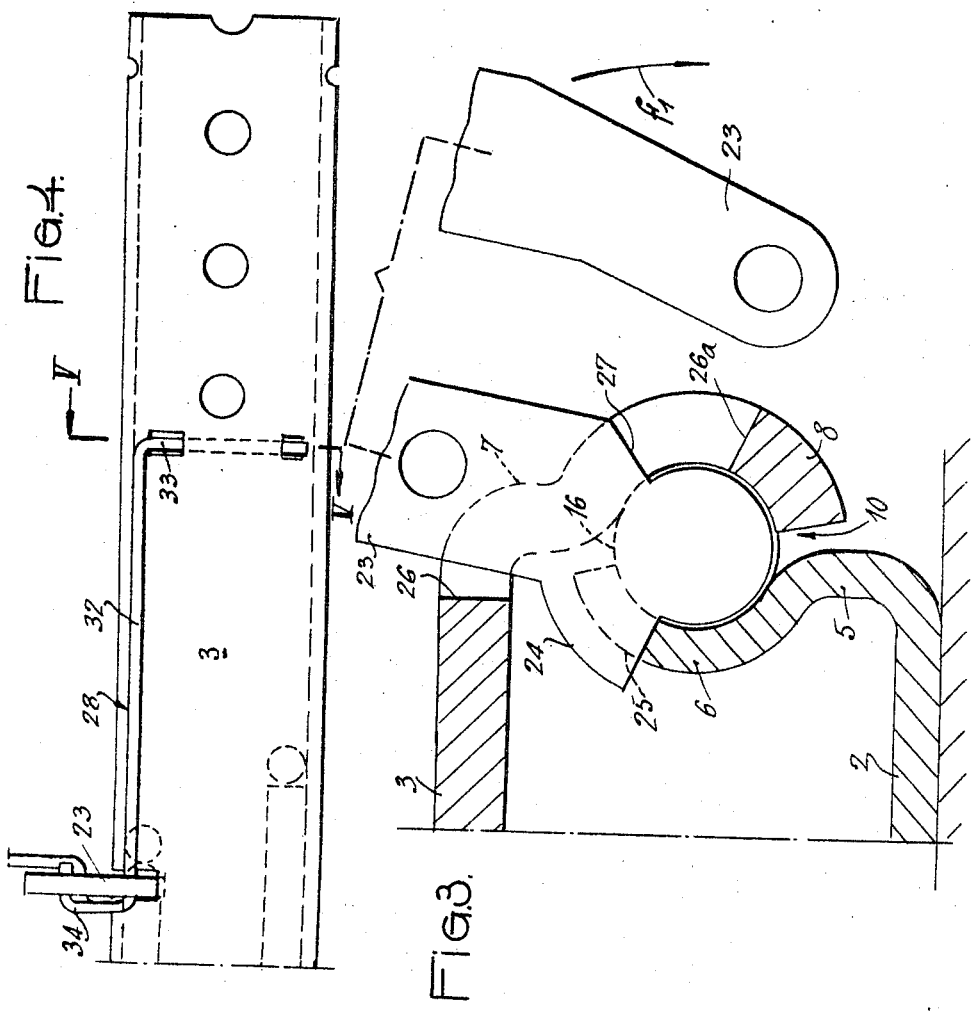

DEVICE FOR SUPPORTING, GUIDING AND ADJUSTING MOBILE SEATS, OR VEHICLE SEATS AND THE LIKE

The present invention relates to means embodied for supporting, guiding and adjusting mobile seats, especially according to a back and fro direction, such as seats for terrestrial and aerial vehicles.

The seats of the above mentioned type are generally placed on two parallel slides respectively constituted by two adapted sectional elements fixed, on one hand, under the seat frame and, on the other hand, on a supporting floor. The sectional elements cooperate together through guiding elements and are, besides, associated to a mechanism for blocking and adjusting their relative position, enabling thereby to move and block the seat according to some predetermined positions along the sliding direction defined by the alignment of the two slides. Such a mechanism comprises a control means placed in a bearing block supported by one of the sectional elements of one of the slides and designed to operate or neutralize a blocking lock resiliently controlled to be premanently operated in engagement inside either one of various notches presented by a bar or ruler being a part of the other sectional element. The various elements constituting such a mechanism must be separately manufactured, placed, fixed and possibly adjusted in relation with the sectional elements of at least one slide, which leads to a relatively high manufacturing and mounting cost.

The present invention has precisely for its object to decrease said cost by creating a seat supporting, sliding and adjusting device comprising a simple blocking and adjusting mechanism directly supported by a slide which forms together the adapted sliding sectional elements, the supporting means for the control means of the mechanism as well as the notched bar limiting the various adjusting positions for the seat.

According to the invention, the guiding and sliding elements placed in one of the rails are constituted by a ball and by a cylindrical rod extending outsidely of the sectional elements to form an operating and controlling means of a lock movably placed in one of the sectional elements and comprising a protuberance designed to be engaged, under action of a resilient element working permanently on the lock, into one of various notches provided in the other sectional element.

Various other characteristics of the invention are moreover shown in the following detailed description.

Embodiments of the invention are shown by way of non restrictive examples in the accompanying drawings, in which:

FIG. 2 is a partly exploded partial plane view, taken along line II—II of FIG. 1.

FIG. 3 is an enlarged transverse sectional view taken along line III—III of FIG. 2.

FIG. 4 is a partial plane view showing a variant of embodiment of one of the constituting elements of the device of the invention.

FIG. 5 is a transverse sectional view taken along line V—V of FIG. 4.

FIG. 6 is a transverse sectional view showing another embodiment of some of the constituting elements of the device of the invention.

Figure 1:
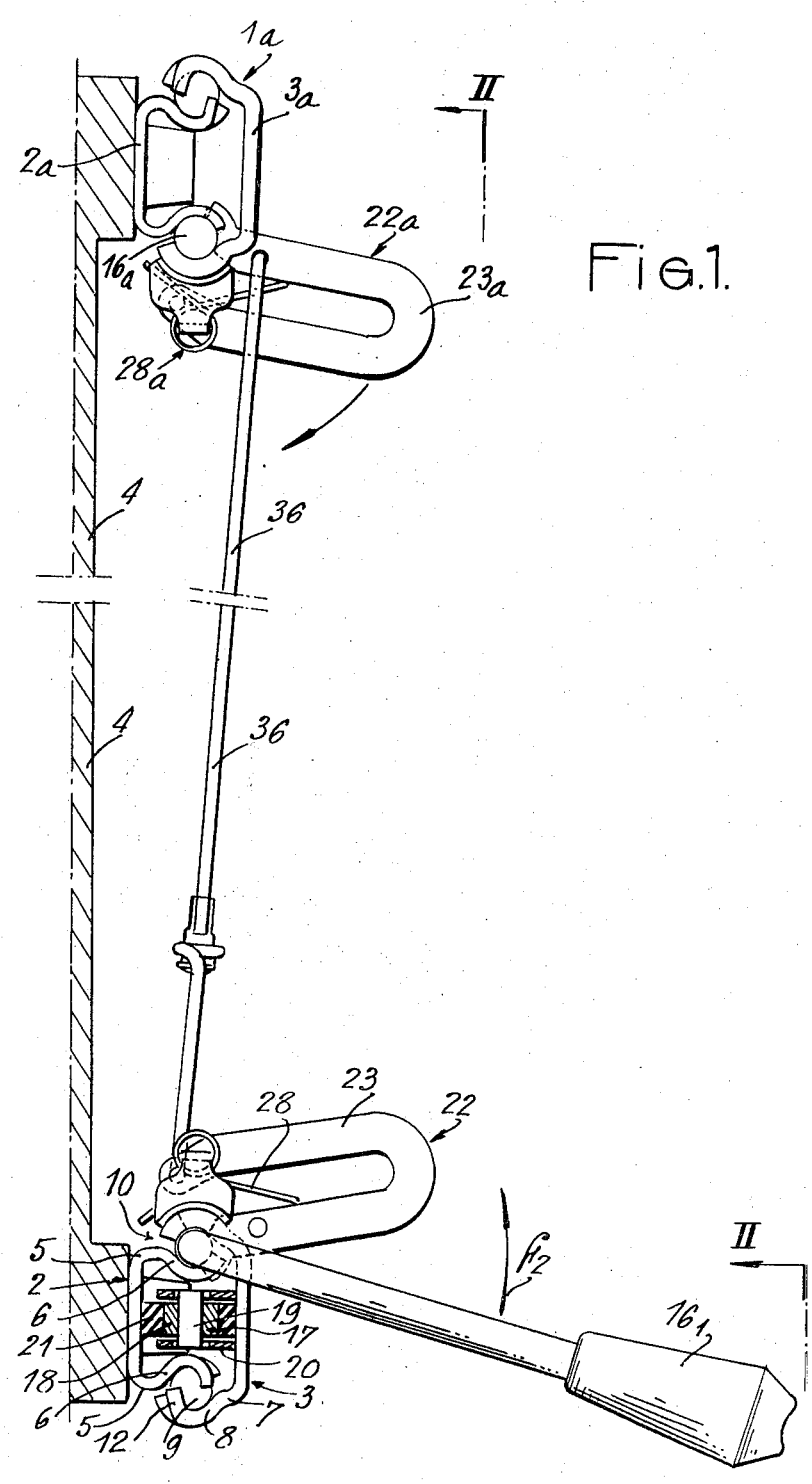
FIG. 1 is a lateral elevation view, partly in section, of the device of the invention.

According to a first embodiment represented in FIGS. 1 to 3, the supporting, guiding and adjusting device for a seat, is constituted by two slides 1 and 1a extending parallely each other. In some cases, it is possible to design the device for the same to comprise only one slide whose mechanical strength characteristics are then calculated in function of the loads possibly applied to the seat. The slides 1 and 1a showing a similar realization, the slide 1 only will be described hereinbelow, being understood that the same references having the index a designate the same parts constituting the slide 1a.

The slide 1 is constituted by a male sectional element 2 and by an adapted female sectional element 3, able to be placed, with no difference, under the seat frame or on a supporting floor 4. The male sectional element 2 has a U-shaped cross-section and comprises vertical wings 5, each delimiting in their median portion a substantially semi-circular and outwardly open groove 6. The female sectional element 3 has also a U-shaped cross-section and forms two wings 7 distant by a transversal measure bigger than the one existing between the wings 5 of the male sectional element 2. The wings 7 of the female sectional element 3 are each shaped, in the median portion thereof, so to delimit a substantially semi-cylindrical and inwardly open groove 8.

The encasing of the sectional elements 2 and 3, as shown in FIG. 1, results in managing, through the facing grooves 5 and 8, two rails 9 and 10 containing guiding and sliding elements which are held fixed inside said rails by end stops 11 and 12 designed at the ends of the sectional elements 2 and 3. The stops 11 and 12 can be constituted by barbs, stampings or folded-back lugs or also by resilient rings protruding partly inside the grooves 6 and 8.

The guiding and sliding elements are constituted by the rail 9 and two balls 13 free to run, or possibly placed under a slight restraint. The balls 13 are separated by a cylindrical rod 14 forming a strut and simultaneously reinforcement or load distribution component for the wings 6 and 8. The cylindrical rod 14 shows preferably a diameter very slightly smaller than the section for the passage of the rail 9. The sliding elements placed in the rail 10 comprise a ball 15 and a cylindrical rod 16, preferably made of steel, of which the diameter is slightly smaller than the cross section of the rail 10 for which said rod constituted also, in addition, a reinforcement component or a load distribution component. The ball 15 is placed, free to run, or possibly under some restraint, between the end of rod 16 directed towards the normally rear portion of the guiding device of a seat and the corresponding end stops. In the particular case where the device comprises two slides 1 and 1a, only the rod 16 of the slide 1 is extended beyond the sectional element 3 of a distance at least equal to the relative sliding possibility between the sectional elements 2 and 3. The outer portion of the rod 16 constitutes an operating component 16a permanently accessible to the user for the control of an adjusting and blocking mechanism 22 which will be described hereinbelow. The rod 16 is thus responsible for two functions, which are : the operation of the sliding element between the wings 6 and 8 and also the function of the control element for which said wings then form a supporting bearing block.

When the device is constituted as represented, it can be decided to provide the slides 1 and 1a with two mechanisms 22 which are simultaneously controlled, in synchronism, by only one operating component $16_1$. The mechanism 22a is then supported by the cylindrical rod 16a which has a length substantially similar to the cylindrical rod 14a and which is not associated to a second ball at the level of its anterior end. Said arrangement makes easier the manufacture and the placing since it is then possible, while leaving the corresponding ends open, to utilize the same sectional elements to constitute, with no difference, the slides 1 or the slides 1a. The lack of balls at the anterior portion of one of the rails of each slide can cause a deformation by torsion at least of the sectional element 3 in case when high loads or restraint are applied. To prevent said disadvantage each anterior end portion comprises a vertical resilient strut 17 designed to resist to possible bending. The resilient strut 17 is preferably constituted as shown in FIG. 1 of a roller 18 free to rotate on a spindle 19 loosely placed in the wings of a clevis 20 fixed to the web of the female sectional element 3. The roller 18 is provided with a band 21 made of a material resiliently deformable and having an outer diameter, when no operating, which is bigger than the vertical space usually existing between the inner sides of the webs of the sectional elements 2 and 3. Upon the placing and constituting of the slide, and band 21 is consequently submitted to a partial crushing which exerts on the sectional elements 2 and 3 a relative action of separation absorbing the existing vertical clearance due to the absence of balls.

According to FIG. 3, the blocking and adjusting mechanism 22 comprises a lever or a crank 23 fixed to the end of the cylindrical rod 16 or 16a. The crank 23 forms, in a protuberance from one of its edges, a step 24 which is directed in such a direction that it can be engaged in either one of the notches 25 made in the wing 6 of the male sectional element 2 delimiting the rail 10. The crank 23 passes through an aperture 26 made from the longitudinal edge of the wing 8 or preferably as a window. In that case, it is necessary to shape the crank 23 to enable its engagement inside the window 26 at the same time as the placing of the cylindrical rod 16 or 16a into the groove 8 before placing the adapted sectional element 2. The crank 23 is provided, from its edge opposite the edge comprising the step 24, with a recess 27 designed to cooperate with the edge 26a of the window 26 and constitute a stop limiting rotation of the lever 23 in the direction of arrow $f_1$ at a sufficient angular magnitude to provide disengagement of the step 24 from the notch 25.

The crank is permanently submitted to the action of a resilient component 28 which holds the mechanism 22 in a state for which the step 24 is operated in a maximal engagement in either one of the notches 25. FIGS. 1 and 2 show that the resilient component 28 can be made of a coil-spring supported by a fitting 29 whose legs 30 and 31 are respectively bearing on the sectional element 3 and on the crank 23.

FIGS. 4 and 5 show a variant of realization wherein the resilient component 28 is constituted by a metallic rod 32 having a leg 33 which is folded at right angles and held for example on the sectional element 3 while the other leg 36 which is also folded at right angles is anchored on the crank 23. In such a realization, the rod 32 works in a similar way as a torsion bar and still simplifies and decreases the manufacturing and placing cost of the mechanism 22.

When the user desires to modify the relative position of the seat placed on the above described guiding device, he operates the operating component 16a in direction of the arrow $f_2$ to rotate the cylindrical rod 16 inside the rail 10 and to submit the crank 23 to motion in direction of arrow $f_1$ against action of the resilient component 28. When the recess 27 is brought in abutment against the edge 26a, the step 24 is removed from the corresponding notch 25 which takes apart the sectional elements 2 and 3 which can, then, be relatively moved. When the user thinks he has reached the new desired position, he releases his action on component $16_1$, thus the resilient component 28 rotates the crank 23 in the opposite direction to ensure the self-engagement of the step 24 into the corresponding notch 25 brought in coincidence therewith.

As it appears from above, the wings 6 and 8 of the rail 10 are futher forming a supporting block for the operating component and a notched bar delimiting the different blocking positions between the two sectional elements. It results therefrom a manufacturing simplification and also a placing simplification as well as a reduction of the number of the constituting elements of each slide which nevertheless has a very good mechanical strength to the longitudinal, vertical and/or transversal deformations under action of loads, restraints or stresses which can be transmitted by the seat. To still improve the strength of the slide, one or several struts 35 can be placed inside the male sectional element 2, said struts raising from the central web to prevent any risk of bending or torsion of the wings 5 inwards in direction of each other.

It appears from the above disclosure that the guiding device is constituted by two substantially similar slides 1 and 1a, each of them comprising a blocking and adjusting mechanism 22 and 22a. In such an example, it is of course desirable to be able to control simultaneously the two mechanisms through only one operational means, and thus the connection is ensured by a connection rod 36 having a variable length in the opposite way from the way of the simultaneous positive control of the cranks 23 and 23a during relative axial release of the sectional elements 2 and 3.

FIG. 6 shows that same means, as those above described, can be embodied when each slide is constituted by a sectional element 37, which is not deformable, and has a substantially V-shaped cross-section, with legs being extended by horizontal wings 38 having or delimiting guiding ways for balls 39 and also for cylindrical rods 40 which are held into the ways of a second sectional element 41 comprising folded-back edges 42 extended by flanged edges 43 surrounding the wings 38 like a cage. In such an embodiment, the ways or rails for the guiding elements are then horizontally open and no longer vertically open as it was the case in the above described case.

The object of this present invention has a preferred embodiment in adjustable position seats placed in motor-car vehicles or aerial vehicles.

The invention is not restricted to the embodiments shown and described in detail, for various modifications thereof can moreover be applied thereto without departing from the scope of the invention as shown in the appended claims.

I claim:

1. Device for supporting, guiding and adjusting mobile seats comprising at least a slide constituted by two complementary adapted sectional elements delimiting two hollow parallel rails containing guiding and sliding elements, the guiding and sliding components placed in one of the rails are constituted by a ball and by a cylindrical rod extending outsidely of the sectional elements for forming operational and control means for a lock movably placed in one of the sectional elements and comprising a protuberance designed to be engaged, under action of a resilient component permanently working on the lock, in one of various notches provided in the other sectional element.

2. Device as set forth in claim 1, comprising a slide formed by two sectional elements having parallel wings delimiting two rails containing guiding and sliding elements constituted, for one of said rails, by two balls separated from each other by a cylindrical strut rod and, for the other rail, by only one ball and by a cylindrical rod extending in the same direction beyond the mobile sectional element on a length at least equal to the relative possible sliding stroke between the two sectional elements.

3. Device as set forth in claim 2, wherein the wing of the mobile sectional element for supporting the cylindrical rod forming control component is provided with a window in which can move the lock fixed to said cylindrical rod and forming a step designed to be engaged into either one of various notches of the corresponding wing of the fixed sectional element.

4. Device as set forth in claim 1, wherein the end portion of the mobile sectional element beyond which extends the extension of the cylindrical rod forming the sliding element is provided with a resilient strut also cooperating with the fixed sectional element to always maintain a vertical and substantially constant spacing between said sectional elements.

5. Device as set forth in claim 2, wherein the resilient strut is constituted by a roller loosely placed on the mobile sectional element and comprises a resilient band whose diameter, when not in operation, is bigger then the vertical spacing normally existing between the sectional elements.

6. Device as set forth in claim 1, wherein the resilient lock is constituted by a crank extending perpendicularly to the cylindrical rod forming sliding component in order to pass through a window provided in the corresponding wing of the mobile sectional element on a length sufficient for the complete removal from the notches of the fixed sectional element of a step formed by the crank at the opposite of a stop designed to cooperate with the corresponding edge of the window.

7. Device as set forth in claim 6, wherein the lock is constituted by a crank fixed to the end of the cylindrical rod forming guiding component and connected to a resilient component constituted by a tension bar anchored on the mobile sectional element by the lock.

8. Device as set forth in claim 1, comprising two substantially similar slides of which one only comprises a cylindrical rod extending beyond one of the sectional element to constitute an operating and controlling means of the blocking and adjusting mechanism which is connected to the similar mechanism of the second slide through a synchrone connection at least in the motion way corresponding to release of the mobile sectional elements from the fixed sectional elements.

* * * * *